Sept. 20, 1949. A. A. GRADISAR 2,482,666
ADJUSTABLE FILM STRIP AND PICTURE PROJECTING DEVICE
Filed April 6, 1946 4 Sheets-Sheet 1
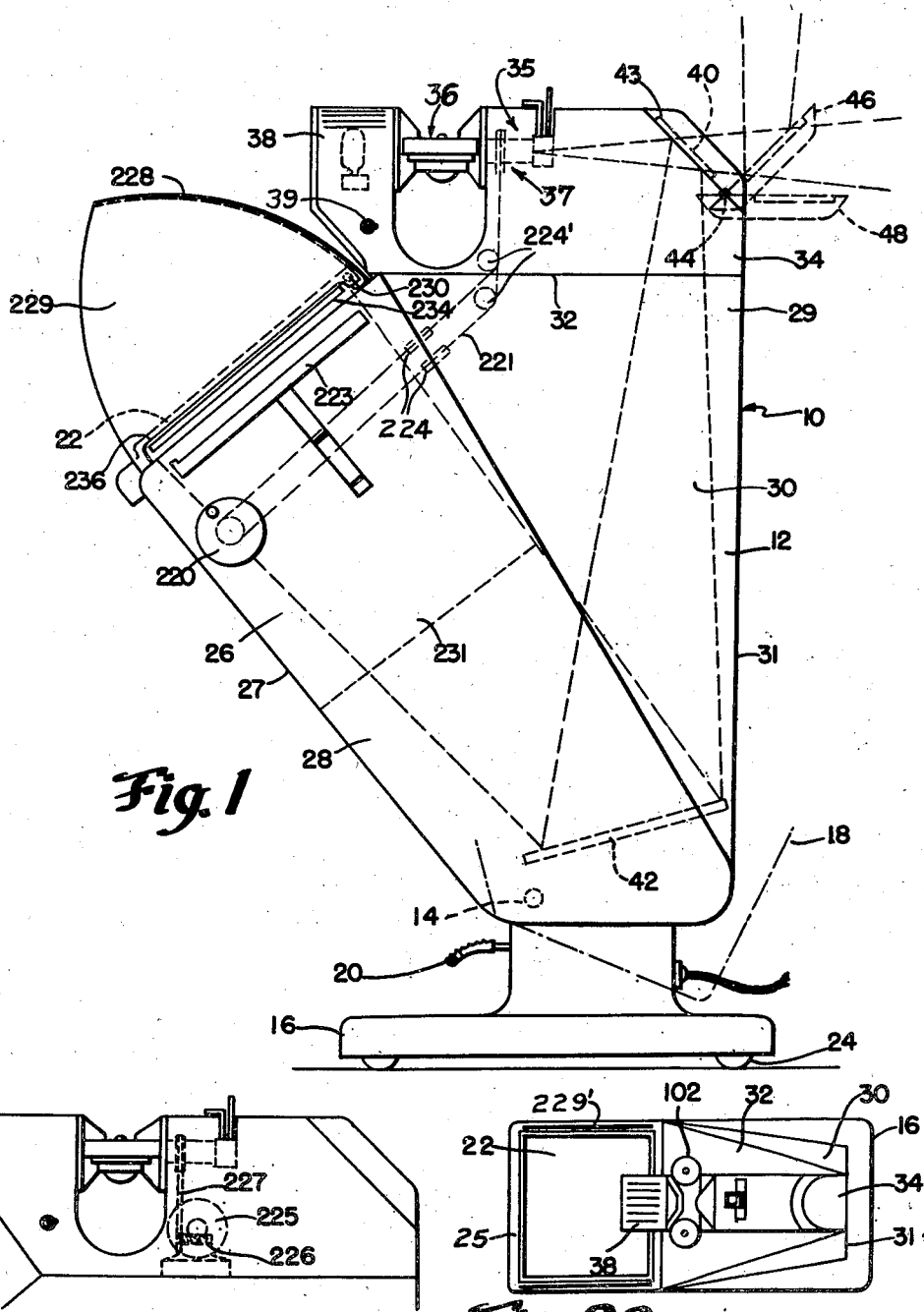
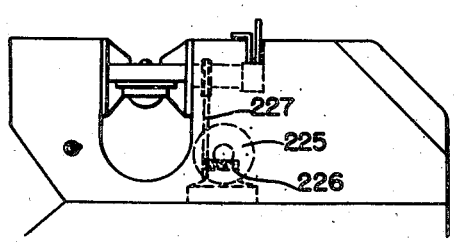
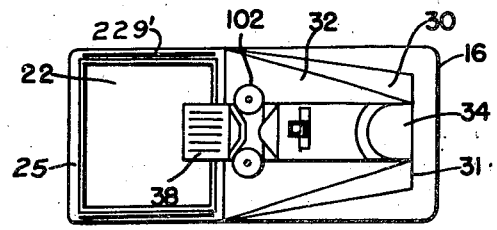
INVENTOR.
ALBIN A. GRADISAR
BY
ATTORNEY Sept. 20, 1949.　　　A. A. GRADISAR　　　2,482,666
ADJUSTABLE FILM STRIP AND PICTURE PROJECTING DEVICE
Filed April 6, 1946　　　　　　　　　　　　4 Sheets-Sheet 2
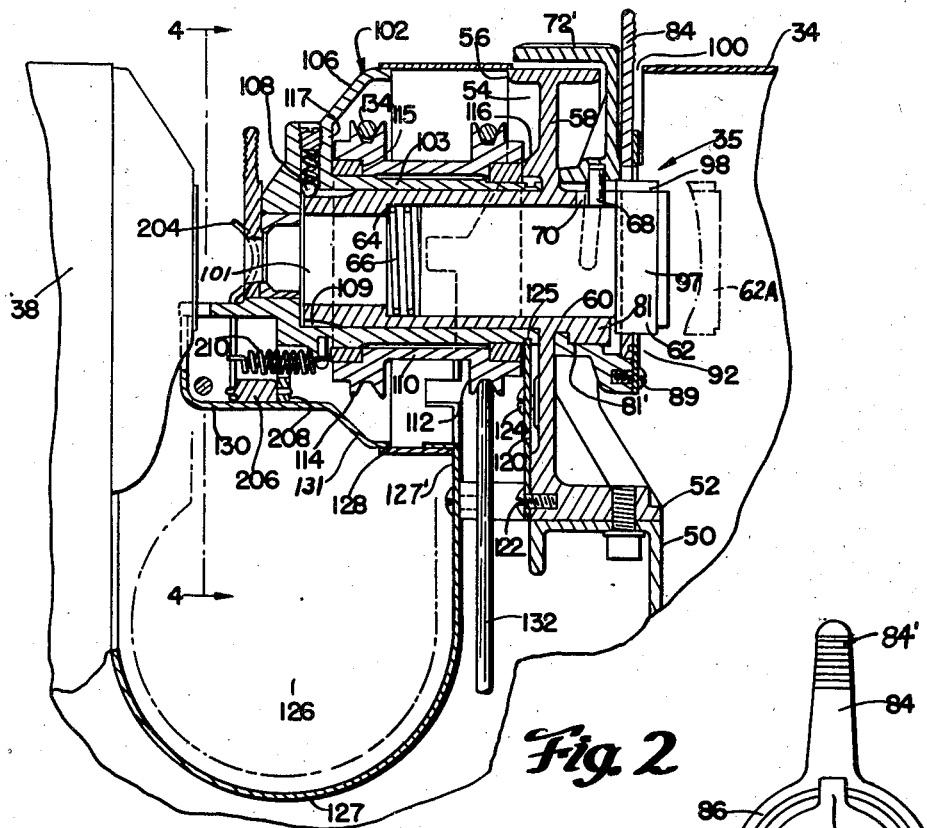
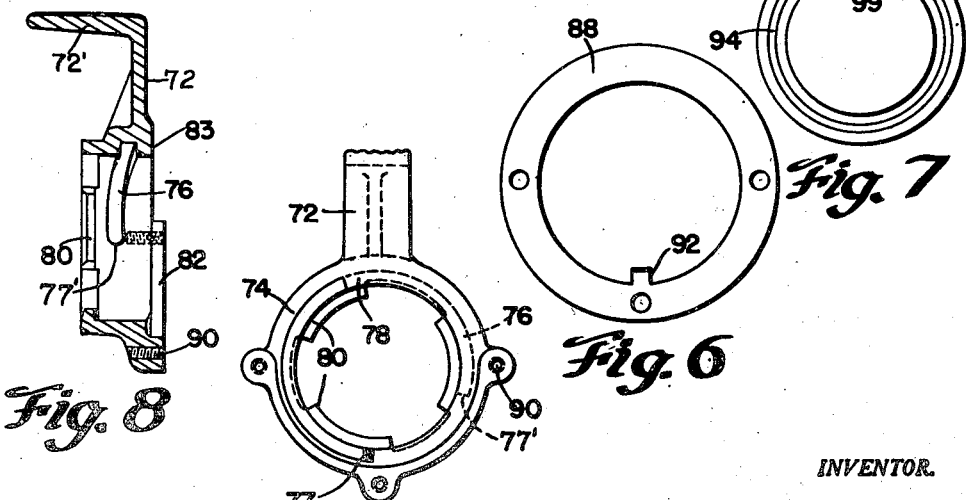
INVENTOR.
ALBIN A. GRADISAR
BY
*Nobly S. Williams*
ATTORNEY Sept. 20, 1949.     A. A. GRADISAR     2,482,666
ADJUSTABLE FILM STRIP AND PICTURE PROJECTING DEVICE
Filed April 6, 1946     4 Sheets-Sheet 3

INVENTOR.
ALBIN A. GRADISAR
BY
ATTORNEY

INVENTOR.
ALBIN A. GRADISAR
BY
ATTORNEY

Patented Sept. 20, 1949

2,482,666

UNITED STATES PATENT OFFICE 2,482,666

ADJUSTABLE FILM STRIP AND PICTURE PROJECTING DEVICE

Albin A. Gradisar, Buffalo, N. Y., assignor to American Optical Company, Southbridge, Mass., a voluntary association of Massachusetts Application April 6, 1946, Serial No. 660,231

24 Claims. (Cl. 88—24)

1

This invention relates to projection apparatus and more particularly to a compact movable self-contained projection device constructed and arranged for showing enlarged images of pictures from photographic strip film upon a screen carried by said device for inspection, comparison, reading, printing, copying or like purposes. The device is also provided with means whereby such pictures may additionally be shown upon a screen or wall located at a distance from the device.

It has become common practice in recent years to take a number of independent pictures of different objects and various subject matter on relatively small size photographic strip film, for example 8 mm. or 16 mm. film, for many different purposes such as providing permanent or duplicate records of documents, checks, periodicals, and the like. Such film records occupy very little space when stored away and not in use and, on the other hand, may be much more readily referred to when desired than can be the originals. When equipped with a suitable device for projecting enlargements of such records any individual picture may be readily and easily inspected without inconvenience or delay. The projection device of this invention is particularly adapted and arranged for such purposes and is, accordingly, provided with means convenient to an operator standing or seated before the device for facilitating the operation of the device while viewing, reading, copying or the like of such photographic records.

Since the individual pictures on such strip film had to be movable into a projection position and then maintained accurately in focus during the projection thereof and since it was often desirous to view certain of such pictures in various angular positions, some projection devices of earlier construction have been provided with rotatable film reel carrying heads supporting a pair of reel spindles and a pair of transparent pressure plates for releasably holding the film in focus during the showing of each picture. The necessity of providing operating means upon a stationary part of the device within easy reach of the operator for driving said spindles and for opening the pressure plates has resulted in complicated and expensive mechanisms. Such mechanisms not only had to move the film in either direction on the rotatable head but also were required to operate one of the transparent pressure plates each time the film was advanced in either direction. The pressure plates had to release the film before the film started to move and had to close the pressure plates thereafter, but such could not be

2 done before the film was at rest for fear of scratches and injury to the film.

The device of the present invention provides simplified means conveniently located for use by an operator standing or seated before the device for actuating the film and moving any desired portion or portions of a strip film into a proper position for projection, and maintaining same in focus during projection, such being accomplished without requiring the use of a movable pressure plate or the like and without requiring expensive and intricate means for opening and closing same each time another picture is to be so positioned for projection purposes.

The projection device of the invention is provided with apertured gate means for supporting strip film in a predetermined curved position during projection, thus removing the necessity of using a movable pressure plate or the like or the actuating means normally associated therewith. This predetermined curvature of the gate is so chosen that buckling of the film is prevented thereby even though an individual frame or picture of the film is exposed for a considerable period of time to the beam and the intense heat of the projecting lamp. To cooperate with the curved gate an objective is chosen which has a curvature of field which will coincide as closely as possible with the gate curvature throughout the entire length of the aperture in the gate. The operating means is provided upon a stationary part of the device and conveniently positioned for use by the operator for moving or controlling the movement of the strip film being advanced in either direction across the film gate so that any desired portion of the film may be rapidly and easily brought into an approximate position and as easily moved slowly into exact position for projection purposes.

The projection device is also constructed and arranged so as to allow the operator to reach and rotate the film reel supporting head, whereby individual pictures imaged upon the viewing screen may be viewed by the operator while rotating same to any preferred angular position or positions, such as onto a side or even upside down. Means is also provided to resist movement of the film while the head is being rotated thereby preventing dislocation of the image on the screen while being rotated.

The device is also constructed and arranged so that the upper part which is in the form of an enclosed housing carrying a viewing screen may be tilted longitudinally to various angular positions for the convenience of different operators when seated or standing before the device. Since this housing is normally substantially fully enclosed dust is excluded from the reflecting means within the housing.

A foldable hood is also provided to shield the viewing screen from external light. While the side members of the hood are arranged to slide through openings into the housing enclosing pocket means, however, prevents dust which may enter through these openings from reaching the interior of the housing. The housing is also provided with an opening and suitable means for receiving and supporting a sensitized paper holder in a position for making enlarged prints under conditions equalling the best of dark room conditions.

It is, accordingly, an object of this invention to provide suitable means in the form of a readily movable self-contained projection device provided with an enclosed housing, a viewing screen and adjustable means whereby the device may be utilized with utmost convenience by an operator for showing images upon said screen or a viewing surface at a distance from the device.

Another object of the invention is to provide convenient and readily operable means whereby enlarged images may be projected either onto the viewing screen of the device or generally horizontally onto a wall or the like or even projected vertically onto the ceiling of a room.

A still further object of the invention is to provide means for projecting images of pictures on photographic strip film upon a screen or surface and for allowing the rotation of said images while so projected to any preferred angular position without affecting the centering of the picture relative to the viewing screen or surface.

Another object of the invention is to provide means whereby photographic strip film may be easily and conveniently advanced in either direction in the projection device regardless of the particular angular position at which the film reel carrying head is disposed.

Another object of the invention is to provide convenient and readily operable positive means whereby the film on the rotatable head may be smoothly, easily and quietly advanced in either direction without having any appreciable play occur between the driving mechanism and the strip of film when the direction of travel of the film is reversed.

An additional object of the invention is to provide means in the form of a curved film supporting and guiding gate structure upon a rotatable film reel supporting head in such a way that the film will be at all times accurately positioned relative to the curvature of field of the objective lens of the device and so that the film may be readily moved through this guiding means by the operator by means located on a stationary part of the device.

A still further object of the invention is to provide a plurality of controls for the device of the character described for controlling the film moving or advancing means, the light source, the objective lens focusing means, the iris aperture, the rotatable film reel carrying head, and the printing or copying means all conveniently located within easy reach of an operator seated before the device.

Another object of the invention is to provide for such a projection device means in the form of a hood or light shield partially surrounding the viewing screen and means for hinging said hood so as to be foldable to a position overlying and protecting said screen. Means in the form of pockets are also provided to function therewith for receiving the side walls of the hood within the device in such a way as to exclude dust and the like from the interior of said device.

A further object of the invention is to provide in conjunction with a foldable light shield for the viewing screen means for receiving a printing frame and supporting same in close proximity to the viewing screen and without disturbing the viewing screen, whereby sensitized paper carried by the printing frame will be in focus without requiring readjustment of parts of the optical system of the device.

With the foregoing and other objects in view, as will hereinafter become apparent from the following description taken in connection with the accompanying drawings, it will be understood that many changes may be made in the details of construction and arrangement of parts without departing from the spirit of the invention as expressed in the accompanying claims. I therefore do not wish to be limited to the exact details of construction and arrangement of parts as shown and described since the preferred form is shown by way of illustration only.

Referring to the accompanying drawings:

Fig. 1 is a side elevational view of a preferred form of the invention;

Fig. 2 is an enlarged view of a portion of Fig. 1 showing parts thereof broken away and in section for disclosing details of construction;

Figs. 5, 6 and 7 are views of mechanical elements employed in the objective lens focusing and iris aperture adjusting structure of Fig. 2;

Fig. 8 is a vertical sectional view of the focusing element of Fig. 5;

Figure 3:
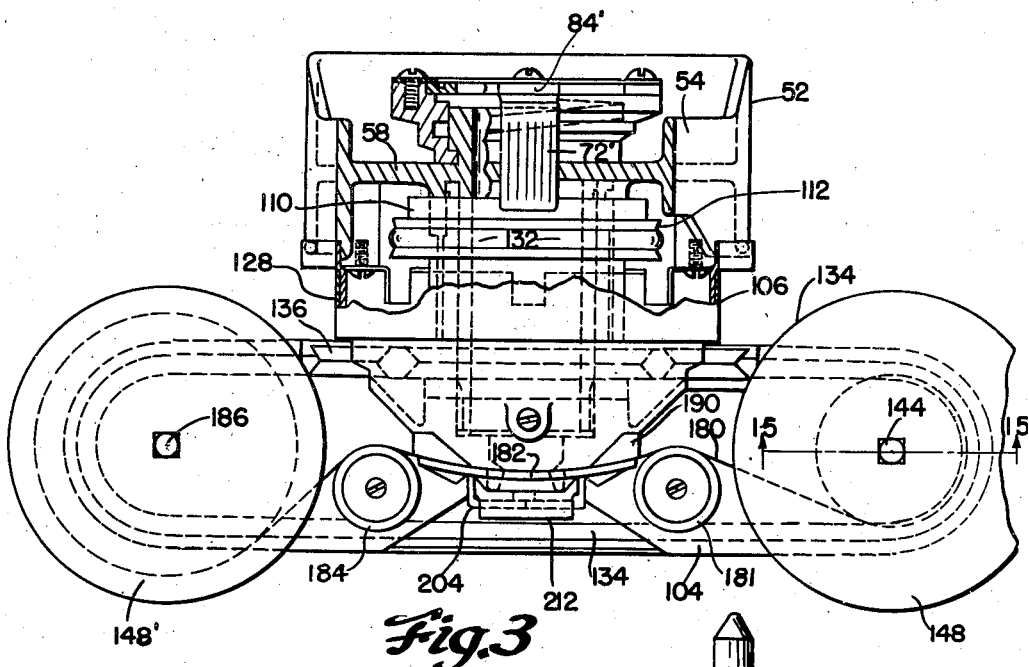
Fig. 3 is a plan and partly broken away view of parts of the structure of Fig. 2.
Figure 17:
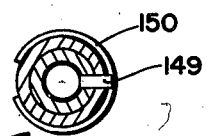
Figure 15:
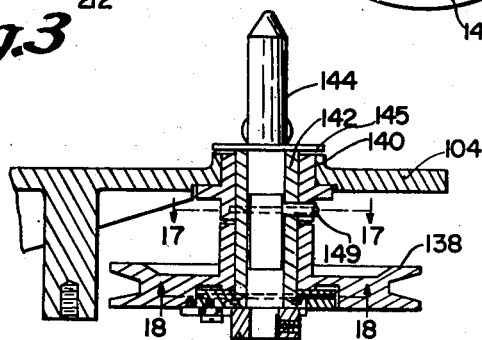
Figure 16:
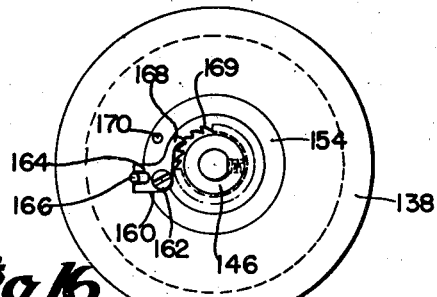
Figure 18:
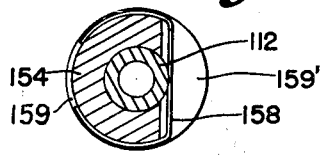
Figure 19:
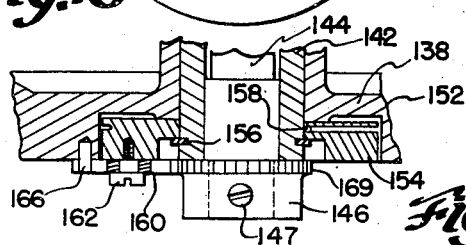
Figure 4:
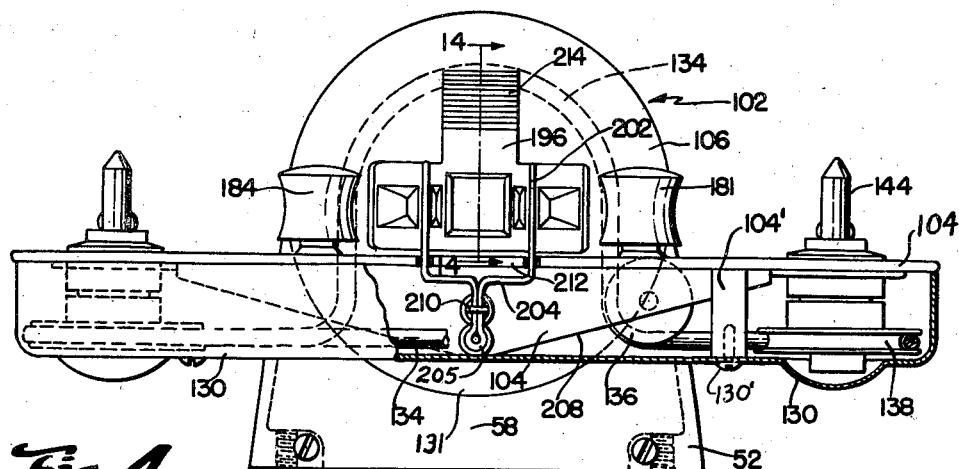
Fig. 4 is a view taken substantially on lines 4—4 of Fig. 2 and looking in the direction of the arrows, parts being broken away to more clearly show details of construction.
Figure 14:
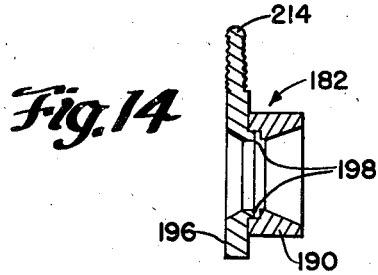
Figure 11:
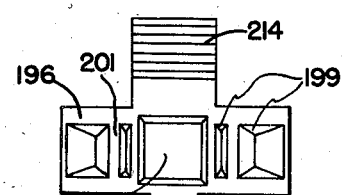
Figure 12:
Figure 13:

Figs. 11, 12, and 13 are different views of the curved movable apertured film gate employed therewith;

Fig. 14 is a fragmentary sectional view taken upon line 14—14 at Fig. 4;

Fig. 15 is a sectional view taken substantially upon line 15—15 of Fig. 3;

Fig. 16 is a bottom view of the structure of Fig. 15;

Fig. 17 is a sectional view taken upon the lines 17—17 of Fig. 15;

Fig. 18 is a sectional view taken on line 18—18 of Fig. 15;

Fig. 19 is an enlarged fragmentary view of a portion of Fig. 15;

Fig. 20 is a diagrammatic plan view of the device of Fig. 1 but with the hood and shelf structure thereof removed; and Fig. 21 is a diagrammatic showing of a modified form of construction of Fig. 1.

Referring to the drawings in detail and in particular Fig. 1 the number 10 indicates generally a projection device embodying the invention and comprises an enclosed housing or cabinet 12 pivotally supported by suitable means to tilt longitudinally about an axis 14 and relative to a supporting base 16 so that the housing 12 may be moved to any of a plurality of preferred angular positions such as, for example, that indicated by broken lines 18 when a brake lever 20 is depressed by the foot of the operator to release holding means (not shown) and allow the operator to grip the sides of the housing and swing the housing forwardly or rearwardly to properly position a viewing screen 22 depending upon the sloping position at which the operator desires to view said screen. The position of use of the device may also depend, for example, upon whether the operator is standing or seated before the viewing screen 22, whether the operator is tall or short, and whether the device is to be used for projection upon the screen 22 or upon a surface or wall located at a distance from the device. In order to make the device readily movable for maximum convenience, pairs of casters or the like 24 are provided beneath the base 16.

The enclosed housing 12 comprises a forward portion 26 having a substantially rectangular upper sloping wall 25 provided with an opening therein adapted to receive the viewing screen 22. The screen is preferably formed of translucent material such as ground glass and placed in the opening with the ground surface outwardly. This forward portion 26 is formed by a front wall 27 and opposed side walls 28 which slope downwardly and rearwardly and to the rear sloping edges of the walls 28 is secured the rear portion 29 of the housing, said portion 29 being formed by opposed side walls 30 sloping slightly inwardly, as shown by Fig. 20, to join vertical rear wall 31. The rear portion 29 is provided with spaced substantially horizontal walls 32 and intermediate these walls is permanently or detachably positioned an open bottom enclosure 34 completing the upper part of the housing and adapted to house an objective lens structure 35 and a film reel supporting head assembly 36 firmly secured to a rigid part within the enclosure 34. The assembly 36 is axially aligned with the conventional light source and condenser lenses within a lamp housing 38 and controlled by switch 39. The details of the objective lens system and the film reel supporting head and an associated film advancing or driving mechanism 37 will be hereinafter more fully described.

Light from the lamp housing 38 is projected horizontally through the film reel supporting head and the objective lens system so as to strike a front surface mirror 40 positioned near the upper rear portion of the enclosure 34, this mirror being normally positioned at such an angle that the light is then reflected downwardly toward a second front surface mirror 42 and thence upwardly onto the ground glass viewing screen 22. The mirror 40 may be positioned, when desired, upon a movable closure member 43 arranged to pivot about an axis 44 so that said mirror and closure, when located in the position shown by dotted lines 46, may direct the light beam from the objective onto the ceiling of a room. The mirror and closure may also be positioned out of the path of the light from said objective lens system as indicated at 48 to allow light therefrom to be directed upon a surface or wall at a distance from the projection device.

The construction of the objective lens structure 35, the film reel supporting head 36 and the associated film driving or advancing mechanism 37 may be more clearly understood by reference to Figs. 2, 3 and 4. Parts of objective lens structure 35, the driving mechanism 37 for moving the film and the rotatable film reel supporting head 36 are supported so as to be rotatable about the optical axis of the objective lens system. For this purpose a rigid transverse frame member 50 is provided within the enclosure 34 and detachably secured thereon is a bracket 52, said bracket being provided with an upstanding rigid frame portion 54 having an outer substantially semi-circular flange 56 and a central transverse web 58. Formed integrally with said web and extending centrally therethrough as a part of the objective lens supporting structure 35 is a tubular portion or part 60 adapted to receive an objective lens system mount 62 therein. The portion 60 is also provided with an internal shoulder 64 against which a compression spring 66 is arranged to seat so that pressure of said spring against the inner end of the objective lens mount 62 may always tend to urge the objective in an outwardly direction. The objective lens mount 62 is provided with a pin or finger 68 adapted to fit within an axially extending slot 70 in said tubular portion 60 and this pin serves to prevent rotation of said lens mount while allowing axial sliding movement thereof when the handle 72' of control lever 72 (see also Figs. 5 and 8) is moved laterally for adjusting the focus of said objective lens in said lens mount. The control lever is integral with a circular collar 74 which is concentric with the tubular portion 60 and provided with an internal spiral groove 76 for engaging the outer end of finger 68 and axially moving the lens mount. The spiral groove starts at a point 77 at the outer wall of the collar 74 and extends approximately 300° to an inner shoulder or stop 77'. The forward wall portion of the groove starts at 78 and extends approximately 150° to the inner shoulder 77'. The outer end of this groove is thus open between points 77 and 78 so that, when the lever 72 is swung to the right (as viewed in Fig. 5) a sufficient amount, the pin 68 on the lens mount 62 is freed therefrom and the mount may be pressed outwardly by the spring 66. When the mount is manually pressed inwardly movement of the lever 72 to the left will bring the forward wall portion 78 of the collar 74 to the outer side of the pin 68 so that the pin becomes completely enclosed in groove 76 and further adjustment of the lever will cause the mount to move inwardly as the pin slides in slot 70 and is actuated by engagement with the groove. Thus the lens mount 62 is removable and may be easily cleaned, or changed if desired. Since the pin is held by slot 70 against lateral movement it may only move in an axial direction and thereby produce a focusing adjustment for the lens mount 62.

The collar 74 is provided preferably with three internal concentric spaced flanges 80 which are adapted to slide between generally similar complementary flanges 81' formed upon the outer surface of an end portion 81 of the tubular part 60 whereby said collar may be initially positioned upon the end portion 81 of the tubular part 60 and over said flanges 81' and when rotated slightly to interengage flanges 80 and 81' will be locked thereon against axial displacement while being free for lateral adjustment of the lever 72 and focusing of the mount 62. Along the front surface of collar 74 is formed a semi-circular edge portion 82 and this edge portion is disposed outwardly of the front surface 83 of the collar 74 so that an iris aperture control lever 84 (see Fig. 7) may have its lower ring shaped portion 86 positioned against the surface 83 and seated in the seat formed by the semi-circular portion 82. The control lever 84 is retained in place by a retaining collar 88 which is held in place against the semi-circular edge 82 by screws 89 threaded into openings 90. The retaining collar 88 is provided with an inwardly built finger 92 adapted to ride in the substantially circular groove 94 formed in the ring shaped portion 86. The seat 82 prevents downward or lateral displacement of the ring portion 86 and the finger 92 prevents upward displacement thereof. At the same time however the handle 84' of the lever 84 may be adjusted laterally as desired.

A lug 98 formed or secured on the upper surface of an iris aperture adjusting collar or ring 97 on the outer end of the lens mount 62 provides means fitting into a recess 99 formed in the ring shaped portion 86 so that lateral swinging movement of the control lever 84 in either direction will cause engagement of the lug 98 by a side wall of the recess 99 and thus produce a rotation of the iris adjusting collar 97 relative to the lens mount 62. At the same time the ring 97 and lug 98 will be free for removal from the supporting structure whenever the lever 72 is rotated to release pin 68 and allow the objective to be moved outwardly as indicated by the dotted lines 62A. The focusing lever 72 and the iris adjusting lever 84 are arranged to extend upwardly and through a transverse slot 100 formed in the wall of the enclosure 34 and are in a convenient position for adjustment by the operator of the device while seated before same.

Positioned about the opposite end 101 of the tubular member 60, is a rotatable film reel supporting head 102 having an integral tubular sleeve portion 103, a transverse film reel supporting frame portion 104 and an intermediate partly conically shaped integral skirt portion 106. The sleeve portion 103 of the rotatable film reel supporting head is positioned upon the end 101 of the tubular member 60 so that the head may be swung about the axis of said tubular member. A spring pressed ball check 108 may be, if desired, positioned in the skirt portion 106 of the rotatable head and arranged to engage in circumferentially spaced recesses 109 formed in the tubular member for maintaining the rotatable head 102 in predetermined angular positions, such as a horizontal position as shown or in a vertical position.

Concentrically positioned about the tubular portion 103 of the film reel supporting head 102 is a rotatable driving ring member 110 having provided near its opposite ends grooved pulleys 112 and 114. This driving member 110 is provided with oilless bearing rings 115 and is retained against axial movement by these rings in engagement with a lug 116 formed integrally on the web 58 and a shouldered portion 117 formed on the skirt portion 106 of the rotatable head 102. The head 102 in turn is retained in place upon the tubular end 101 of member 60 by an adjustable resilient plate 120 secured at its lower edge by screws 122 to the bracket 52 and provided at an intermediate location with a pair of laterally spaced adjusting screws 124 arranged to control the amount of spring pressure afforded by said plate 120 through engagement of its upper semi-circular edge in a circumferential groove 125 formed in tubular sleeve portion 103.

A well or recess 126 is formed in the enclosure 34 for allowing the rotatable film reel supporting head 102 to be manually swung as desired about the axis of the tubular member 60 and the objective 62 and this well is separated from the interior of the housing 10 of the projection device by a curved wall 127 which has its upper edge 127' formed to extend partially about the rotatable driving member 110 and form with the curved upper flanged part 56 a shoulder for engagement by a sheet metal collar 128 which is provided for closing the space between these parts and the conical skirt portion of the rotatable film reel supporting head 102. A removable pan 130 is provided for enclosing most of the mechanism carried beneath the film reel supporting frame 104 and may be secured thereto by screws 130' threaded into projections 104' on frame 104. The pan has its central portion 131 bent downwardly as best shown by Figs. 2 and 4 for cooperating with the collar 128 for enclosing and protecting the operating parts on the head.

An endless driving belt 132 is arranged to transmit power to the pulley 112 on the member 110 and the pulley 114 driven thereby is arranged to drive a second endless belt 134 which, as clearly shown by Fig. 4, rides over the upper portion of the pulley 114 then downwardly and about a pair of laterally spaced guide pulleys 136 and outwardly laterally to a pair of driving pulleys 138 carried adjacent the opposite ends of the film reel supporting frame 104.

The film reel actuating mechanisms associated with the pulleys 138 at opposite ends of the frame 104 are identical, except reversed relative to each other, and accordingly a description of one will adequately describe both. Fig. 15 shows a bushing 140 pressed into an aperture formed in frame member 104 and within this bushing is positioned a tubular member 142. The member 142 serves to provide spaced bearing surfaces for a spindle 144 positioned for rotation therein and about the outer lower portion of the member 142 is fitted the rotatable pulley 138. The spindle 144 is retained in position in the member 142 by an integral flange 145 engaging the upper edge of the member 142 and a driving collar 146 located on the opposite end of the member 142. This collar is provided with set screw 147 which engages a flat portion near the lower end of the spindle 144 and thus is arranged to provide a driving connection therebetween. In order to prevent unrestrained rotation of the spindle 144 when a film reel, such as indicated at 148, is positioned thereon and film is being withdrawn therefrom a friction or drag pin 149 is provided. This pin 149 extends through openings in the bushing 140 and the tubular member 142 and has its inner end in pressing engagement with the surface of the spindle 144, said pin being pressed into such engagement by a C-shaped spring 150 as best shown by Fig. 17.

Within a circular recess 152 formed in the pulley 138 (see Fig. 19) is positioned a pawl carrying member 154 which is concentrically positioned about the lower end of the tubular member 142 and held in position thereon by a C-shaped resilient retainer 156 seated in a groove in member 142. Frictional engagement between the pawl supporting member 154 and the tubular member 142 is produced by a spring member 158, see Fig. 18, having its ends seated in a groove 159 and its straight intermediate portion positioned in a deep slot 159' and bearing against the side of the tubular member 142. Thus this pawl supporting member 154 is provided with sufficient drag or friction by this spring 158 to cause it to tend to remain in a stationary position when the pulley 138 starts to rotate even though these two members are in contact with each other. A pawl or coupling member 160 pivotally carried as indicated at 162 upon this member 154 has a bifurcated outer end 164 adapted to straddle a pin 166 carried by the pulley 138. It will be readily seen that rotation of the pulley 138 by the belt 134 in a clockwise direction as viewed in Fig. 16 while the member 154 tends to remain stationary will cause the pin 166 to swing the pawl in a clockwise direction and cause its opposite toothed end 168 to engage in ratchet teeth 169 formed on the upper portion of the driving collar 146 and thus cause a positive driving engagement between the pulley 138 and this toothed driving member 146. Such rotation of the pulley 138 will cause rotation of the spindle 144 in the same direction for winding film upon the reel 148.

Rotation of the pulley 138, however, in the opposite direction when the opposite reel 148' is being driven by belt 134 will cause the pin 166 to swing the bifurcated outer end of the pawl 160 in a counterclockwise direction (since member 154 carrying the pawl tends to remain stationary) about the pivot 162, disengaging the toothed end 168 of the pawl from the teeth 169 and swinging same into engagement with a stop 170 carried on member 154. Under such conditions, as will be seen, the driving member 146 and spindle 144 will be immediately disengaged from the pawl 160 and thus the spindle 144 and reel 148 carried thereby may rotate at any speed required and in accordance with the rate at which the film is being withdrawn from reel 148 by reel 148'. Thus when reel 148 is being driven by pulley 138 to wind film upon this reel a positive drive is promptly effected between the pulley and the driving member 146 by the pawl 160 but when the opposite reel 148' starts to draw the film in the opposite direction the pawl 160 immediately disengages leaving this spindle 144 entirely free to rotate, except for the friction of drag pin 149.

Figure 9:
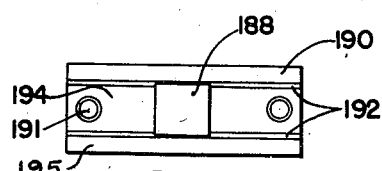
Figs. 9 and 10 are views of the stationary curved apertured film gate employed in the device.
Figure 10:

The film 180 carried by reel 148 is arranged to travel around a guide pulley 181 and then through a curved film gate assembly generally indicated by the numeral 182 and then about a second guide pulley 184 and onto the other reel 148' positioned on spindle 186. This curved film gate assembly 182 is provided with a stationary gate member 190 of a predetermined curvature in the longitudinal direction of travel of the film such that any tendency of the film 180 to buckle when positioned across projection aperture 188 (see Figs. 9 and 10) formed in the stationary gate member 190 will be prevented even though no pressure plate or the like is used to hold the film against gate member 190. The stationary gate member is provided with holes 191 at its opposite ends for attachment to the skirt portion 106 of the rotatable head 102. This gate member is also provided with a pair of curved side rails or guides 192 positioned adjacent opposite sides of a curved recessed portion 194 and inwardly of the curved side portions 195 so as to support opposite edges of the film traversing the projection aperture 188 in such a manner that the intermediate picture carrying portion is maintained in a spaced relation with respect to recessed portion 194. In this manner marring or scratching of the center or picture portion of the film is avoided.

A movable closure member 196 is provided to function with the stationary gate member 190 and serves to prevent accidental displacement of the film extending through the film gate assembly. This closure member 196 is best shown by Figs. 11, 12 and 13 and is provided with a pair of spaced ribs 198 adapted to fit between the side portions 195 of the stationary gate member 190 as clearly shown by Fig. 14 but are of such thickness that a clearance between said ribs 198 and the side rails 192 is greater than the thickness of film 180 and preferably approximately equal to twice the film thickness. Normally the film moving through the curved film gate will bear only against the side rails 192. However, should a splice in the film move through the film gate assembly the member 196 may yield slightly if necessary to accommodate such a condition. For this purpose the outer face of the closure member 196 is provided with a pair of spaced upstanding projections 199 at each side of a central projection aperture 200, such spacing forming a groove 201 at each side of said aperture for the reception of upwardly extending spaced arms 202 of a pressure member 204 (see Figs. 2 and 4) which has a lower looped portion 205 arranged to fit over a pin 206 carried by a flange 208 formed preferably integrally with the film reel supporting head 102. A tension spring 210 engages this pressure member 204 at a location above the pin 206 and is anchored to the supporting head 102 by a fixed pin in such a manner that a spring pressure is at all times urging the arms 202 against the closure member 196, thus yieldably retaining said member in operative position against the stationary gate member 190. Since the arms 202 extend closely adjacent opposite sides of a forwardly extending lip portion 212 (see Fig. 3) formed on the frame member 104 lateral movement of these arms is prevented and, accordingly, any material lateral movement of the movable closure member is likewise prevented. However, forward pressure on a finger piece 214 extending upwardly from the closure member 196 may readily be affected by the operator of the device when it is desired to insert or remove a film from the curved film gate assembly. It should also be noted that guide pulleys 181 and 184 have their peripheral surfaces concaved so that only the edge portions of the film engages thereon, further avoiding marring or scratching of the film.

As previously stated the curvature of the curved film gate assembly 182 is such that buckling of the film positioned across the projection aperture 188 is prevented and to function therewith an objective lens system, as a Petzval objective such as disclosed by the Mechau Patent No. 1,421,523, having a relatively sharp curvature of field is chosen so as to be as close as possible like the curvature of the film gate member 190. In such a matching of the longitudinal curvature of the film to the more or less spherical curvature of the field of the objective lens system best results will result when the curvature of the objective matches substantially the curvature of the diagonals of the aperture 188 since this aperture is preferably approximately square. Under such conditions the exposed picture would be in exact focus along the diagonals. However, the depth of focus of the objective would be ample to afford very satisfactory imaging of all parts of the picture upon the screen 22 or a wall of a room.

If desired a plano-cylindrical lens might be employed within the inner end of the stationary gate member 190 and arranged to produce an effective curvature of the film in a direction at right angles to the curvature therein produced by film gate member 190. Under such conditions all exposed portions of the film would be more nearly in exact focus and noticeably similar to the Mechau lens system. However, the use of such a corrective lens is not ideal since it will collect dust particles and the like and must be occasionally cleaned. It has been found for use with small size film, such as 8 and 16 mm. film that such cylindrical lens may be dispensed with, and still give fairly sharp imaging. When the structure is arranged for larger size strip film, however, such a lens might readily be added and give more advantageous results.

In Fig. 1 an operating handle 220 of the driving mechanism 37 is shown and a tensioned flexible belt 221 extends from a pulley operated thereby, around guide pulleys 224, 224' and over the driving pulley 112 previously described. By such means an operator standing or seated before the device may operate the handle 220 for advancing the film 180 in either direction across the curved film gate. The friction provided in the operating parts on the film reel supporting head 102 is sufficient to maintain the film tensioned and thus in contact with the curved side rails 192 at all times. By manually gripping an end of the frame portion 104 of the supporting head it may be swung about the optical axis of the objective lens system and thus the image on the screen 22 or a wall at a distance from the device may be rotated to any angular position desired. This friction in the film driving mechanism will also be sufficient to prevent movement of the film across the aperture 188 while the head 102 is being angularly moved.

In a modified construction shown by Fig. 21, it will be seen that a reversible electric motor 225 having a reduction gear unit 226 carried thereby may be connected by means of a flexible endless belt 227 to the driving pulley 112 and when a switch of conventional construction is provided for same on a side of the cabinet the motor may be operated at various speeds in either direction for moving the film as desired.

For best results a light shielding hood 228 may be provided to extend over the viewing screen 22 and provided with sides 229 at opposite sides of said screen. This opaque shield is preferably provided with a hinge connection 230 near its upper rear edge so that the hood may be swung downwardly to overlie and protect the screen 22 when the device is not in use, and at such times the sides 229 may extend into slots 229' in the wall 25 at opposite sides of the viewing screen and lie within pockets 231 formed within the forward portion 26. These pockets 231 are completely enclosed, except for said slots, so that no dust or the like entering the slots may reach the interior of the housing 12. This is important since maximum efficiency of the device may only be accomplished when reflector 42 is free from dust or the like.

A foldable shelf 233 may be provided upon one side of the housing 12 for the convenience of the operator of the device. For printing purposes a slot 234 is provided in a side of the device immediately below the plane of the viewing screen 22 and adapted to receive a printing frame of conventional construction slipped into place immediately beneath said viewing screen. Laterally extending guide rails or the like (not shown) may be provided adjacent the upper and lower ends of this slot and function to support the printing frame in position beneath screen 22. The side member 229 at the side of the device provided with slot 234 is upwardly recessed along its lower edge as indicated at 236 so that said printing frame may be readily slipped into place for printing purposes. The pivot 230 for the hood may be of any known construction but preferably should be provided with means for adjusting the friction thereof so that said hood will remain in any adjusted position when moved by the operator.

It will be seen that the use of the curved film gate in conjunction with the rotatable film reel supporting head 102 avoids the necessity of employing complicated mechanism for transmitting power from the operator's control means on the stationary housing of the projection device through a rotatable assembly for opening and closing pressure plates or the like as was previously required in devices of earlier construction. At the same time, since the driving mechanism and the curvature of the curved film gate 190 are such as to hold the film in proper position for projection purposes, apertures instead of transparent pressure plates, may be employed in the curved film gate assembly 182 and the difficulty of maintaining such pressure plates in a clean condition is avoided. Thus applicant has produced a simplified structure which functions in an efficient and convenient manner. From the foregoing it will be seen that the invention provided a simple and efficient means for obtaining all of the results and advantages set forth above.

Having described my invention, I claim:

1. A projection device of the character described comprising an enclosed housing, a light source and a horizontally disposed tubular support positioned within the housing, a viewing screen forming a wall portion of said housing, reflecting means within said housing, an objective supported within said tubular support for projecting light onto said reflecting means so as to be imaged upon said screen, a rotatable film reel supporting head also carried by said tubular support, said supporting head extending outwardly through an aperture in said housing and having laterally spaced spindle supporting arms thereon, an apertured film gate on said head intermediate said spindles, and a recess formed in said housing between said light source and said tubular support, said recess being of sufficient size to allow unrestricted rotational movement of the said film reel supporting head including said supporting arms, spindle and film reels carried thereby about the optical axis of said objective and relative to said housing.

2. A projection device of the character described comprising an enclosed housing, a light source and a horizontally disposed tubular support positioned within the housing, a viewing screen forming a wall portion of said housing, reflecting means within said housing, an objective supported within said tubular support for projecting light onto said reflecting means so as to be imaged upon said screen, a rotatable film reel supporting head also carried by said tubular support, a recess formed in said housing intermediate the light source and said tubular support, said supporting head extending outwardly through an aperture formed in said housing and into said recess, said supporting head having laterally extending arms carrying film reel spindles near their outer ends, an apertured film gate carried by said head intermediate said spindles, said recess being of sufficient size to allow unrestricted pivotal movement of said supporting head including said arms, spindles and film reels carried thereby about the optical axis of said objective and relative to said enclosed housing, and means on said housing and operatively connected to said spindles for actuating either of said spindles for moving film supported thereby in either direction across said film gate regardless of the angular position of said head relative to said housing.

3. A projection device of the character described comprising an enclosed housing, a light source and a horizontally disposed tubular supporting member positioned within said housing, an objective adjustably supported within said tubular member, a rotatable film reel supporting head also supported by said tubular member and having a portion thereof extending outwardly through an aperture in said housing, said head being arranged to swing about the optical axis of said objective, laterally extending rigid arms supporting reel spindles carried by the extending portion of said rotatable head, an apertured film gate mounted on said extending portion intermediate said spindles, a recess formed in a wall portion of said housing between said light source and said tubular support arranged to allow said spindle supporting arms to swing completely about the optical axis of said objective during use of the device, and manually controllable means on said housing and operatively connected with said spindles for selectively driving either of said spindles in a predetermined direction, whereby film supported by said spindles may be moved in either direction across said gate.

4. A projection device of the character described comprising an enclosed housing, a light source and a tubular member positioned within said housing and a translucent screen forming a wall portion thereof, an objective having a curved field adjustably supported by said tubular member, a rotatable film reel supporting head also supported by said tubular member and adapted to swing about the optical axis of said objective, laterally extending rigid arms supporting reel spindles carried by said rotatable head, an apertured film gate mounted on said head intermediate said spindles, said film gate having a pair of film guiding rails which are laterally spaced and longitudinally curved with respect to the direction of travel of the film so as to conform substantially to the curvature of field of said objective, a recess formed in a wall portion of said housing between the light source and said tubular supporting member and arranged to allow said head and spindle supporting arms when supporting film reels thereon to be swung completely about the optical axis of said objective, and means on said housing and operatively connected with said spindles on said head for driving said spindles, whereby said film on said head may be rotated therewith to rotate the projected image upon said screen and said film may be moved in either direction as desired across said gate regardless of the angular position of said head.

5. A projection device of the character described comprising a supporting structure, a tubular member carried by said supporting structure, a film reel supporting head carried by said tubular member and adapted for swinging movement about the axis of said tubular member, said supporting head carrying an apertured longitudinally curved film gate and a pair of rigid arms extending laterally in opposite directions from said film gate, reel supporting spindles positioned upon said arms, friction means on said head for maintaining film when positioned between reels on said spindles in a tensioned condition so as to be maintained in curvilinear contact with said film gate either when said film is stationary or is being drawn through said gate, and driving means on said supporting structure and operatively connected to said spindles for selectively actuating one or the other of said spindles for drawing said film in either direction across said film gate regardless of the angular position of the head relative to said supporting structure.

6. A projection device of the character described comprising a supporting structure, a light source, a tubular member carried by said supporting structure, an objective adjustably supported thereon and axially aligned with said light source, said objective having a relatively sharply curved field, a rotatable film reel supporting head also carried by said tubular member for swinging movement about said axis, said supporting head having an apertured curved film gate positioned thereon and a pair of rigid arms extending laterally in opposite directions from said curved gate, a pair of reel supporting spindles carried near the opposite ends of said arms, the curvature of said film gate in the direction of travel of the film across said gate between reels positioned on said spindles being so shaped as to coincide substantially with the curvature of field of said objective, friction means on said head for maintaining the film extending between said reels normally in contact with said curved film gate, and driving means including a manual control member on said supporting structure operatively connected to said spindles for selectively actuating either of said spindles for moving the film in opposite directions across said gate regardless of the angular position of said head relative to said supporting structure.

7. A projection device of the character described comprising a supporting structure including a housing, a tubular support carried thereby, an objective and a film reel supporting head carried by said tubular support, a pair of rigid arms and an intermediate longitudinally curved film gate supported by said head, a reel supporting spindle rotatably carried on each of said arms, friction means engaging each spindle, a positive clutch mechanism and a driven member associated with each spindle, said friction means serving to normally maintain film extending between film reels positioned on said spindles in a curved position in engagement with said curved film gate, and driving means including a manual control member on said supporting structure for operating said spindles, said clutch mechanisms and said driven members serving to selectively actuate one or the other of said spindles when said driving means is operated regardless of the angular position of said head relative to said supporting structure.

8. A projection device of the character described comprising a supporting structure, a tubular support carried thereby, an objective axially adjustable relative to said tubular support, a film reel supporting head rotatably carried by said tubular support and movable about the axis of said objective, spaced reel supporting spindles carried on said head and an apertured longitudinally curved film gate thereon intermediate said spindles, driving means including a positive clutch associated with each spindle, a friction member engaging each spindle, actuating means including a manual control member on said supporting structure and an operative connection between said manual control member and said spindle driving means for rotating same regardless of the angular position of said head relative to said supporting structure, said operative connection comprising a driving collar mounted to rotate about said tubular support, an endless belt engaging said driving collar and said spindle driving means, and a second belt operatively connecting said driving collar and said manual control member, whereby movement of said control member in either direction will correspondingly operate one or the other of said spindles for moving film across said apertured gate.

9. A projection device of the character described comprising a supporting structure, an elongated tubular support carried by said structure, an objective lens mount adjustably positioned within said tubular support, a film reel supporting head including an elongated integral sleeve pivotally mounted thereon and adapted to rotate about said support and the optical axis of said objective, a driving collar rotatably positioned on said integral sleeve and adapted to rotate about said optical axis, said supporting head carrying a film gate thereon in axial alignment with said objective lens mount, a pair of laterally extending rigid arms integral with said sleeve and having spindles positioned thereon at opposite sides of said gate, driving means on said head operatively connecting said driving collar and spindles, means on said supporting structure including a manual control for rotating said collar to rotate said spindles for moving the film in either direction across said gate regardless of the angular position of said head, and adjustable friction means on said supporting structure and engaging a circumferential surface on said integral sleeve for restraining said sleeve against axial movement and preventing undesired rotation of said sleeve by said collar thereon when said collar is rotated.

10. In a projection device of the character described a housing, a tubular supporting member within said housing, a rotatable head carried by said housing and projecting outwardly through an opening therein and adapted to support film and film reels for swinging movement about the axis of said tubular member for projection purposes, a driving member associated therewith, said head comprising a sleeve, a rigid frame, a skirt portion and an apertured film guiding portion, said sleeve being integral with said rigid frame and skirt portion and having inner and outer cylindrical surfaces for pivotally mounting said head upon said tubular member and for receiving said driving member concentrically thereon, a pair of film reel spindles carried by said rigid frame at opposite sides of said aperture, said skirt portion partially surrounding said driving member and said cylindrical surface supporting said driving member, actuating means on said spindles operatively connected to said driving member so as to be actuated thereby when said driving member is rotated and a removable pan carried by said head and arranged to enclose said spindle actuating means and partially surround said driving member, said skirt and pan each having portions adjacent said opening so as to jointly substantially completely close said opening.

11. A projection device of the character described comprising a supporting structure, a tubular support carried thereby, a film reel supporting head mounted on said tubular support and arranged to be angularly moved about the axis of said support, a pair of laterally extending arms on said head supporting spindles near their opposed ends, friction means in operative engagement with each spindle each spindle being adapted to receive a film reel thereon, an apertured film gate on said head intermediate said spindles, a grooved driving pulley and a one way positive clutch mechanism associated with each spindle, a driving collar having a pair of grooves formed therein and concentrically mounted about said tubular support, an endless driving belt engaging one of said grooves in said collar and the grooves in said driving pulleys, a grooved actuating pulley on said supporting structure, and a second endless belt engaging said actuating pulley and another groove in said collar, whereby rotation of said actuating pulley in opposite directions will selectively rotate one or the other of said spindles for moving said film across said film gate regardless of the angular position of said head relative to said supporting structure.

12. In a projection device of the character described comprising a supporting structure, a tubular support carried thereby, an objective carried by said tubular support and having a relatively sharply curved field, a film reel supporting head pivotally mounted on said tubular support and arranged to swing about the optical axis of said objective, a pair of arms on said head for supporting spindles adapted to receive film reels thereon, and an apertured film gate positioned on said head intermediate said spindles and axially aligned with said objective, said film gate having a pair of laterally spaced longitudinally curved guide rails for engagement by opposite lateral edge portions of film extending between said reels on said spindles, and means associated with said spindles for moving said film across the gate and for constantly maintaining the film in engagement with said curved guide rails, said guide rails being arranged to support the film so that the part thereof intermediate said lateral edge portions is in spaced relation to all portions of said film gate, said guide rails having a predetermined longitudinal curvature such that the diagonal of an exposed picture carrying film surface extended across the gate aperture would coincide substantially exactly to the curvature of field of said objective.

13. A projection device of the character described comprising a support, an objective having a curved field and film guiding means mounted on said support, said guiding means comprising a fixed gate member and a movable closure member having aligned projection apertures formed therein, the aperture in one of said members being of such size as to frame a portion of a strip of film when positioned between said members, a pair of laterally spaced guide rails carried by said fixed gate member and having a curvature in the longitudinal direction of travel of the film corresponding substantially to the curvature of the field of said objective, centering shoulders on said fixed gate member located outwardly of said guide rails, spaced flanges carried by said movable closure member and arranged to fit closely between said shoulders and overlie the film engaging surfaces of said guide rails, a recess formed in said fixed gate member between said rails for spacing the intermediate portion of said fixed gate member in spaced relation to film supported by guide rails, and means for yieldably urging said movable closure member into operative engagement with said fixed gate member while maintaining the apertures therein in operative alignment.

14. In a projection device of the character described a supporting structure, a tubular support mounted thereon, an objective lens system carried by said tubular support, a film reel supporting head rotatably mounted on said tubular support for movement about the optical axis of said objective lens system, adjustable means for frictionally retaining said head in any desired angular position of adjustment relative to said tubular support, rigid arms carried by said head and a pair of laterally spaced reel supporting spindles mounted thereon, an apertured film gate on said head between said spindles, actuating means on said supporting structure for rotating said spindles for moving the film across said gate irrespective of the angular position of said head, a one way clutch means associated with each spindle, and driving means for operatively connecting said actuating means and said clutch means, each clutch means including a driving member, an intermediate carrier, a coupling member and a driven member, said coupling member being pivoted on said carrier, and having a first part connected to the driving member and a second part actuated thereby and arranged to move respectively into or out of positive driving engagement with said driven member as said driving member start to move in a forward or in a reversed direction, whereby either spindle may be positively driven or freed for rotation as the case may be depending upon the direction of rotation of the actuating means.

15. A projection device of the character described comprising a support, film guiding means mounted thereon, said film guiding means including a fixed gate member and a movable closure member having aligned apertures formed therein, one of said apertures being of such size as to frame a portion of strip film positioned between said members, a pair of longitudinally curved film engaging guide surfaces formed on said fixed member in laterally spaced relations for guiding opposite edge portions of a film positioned across the aperture in said fixed member, shoulder portions formed on said fixed member and normally spaced outwardly of said guide surfaces and the film positioned therein, complementary centering shoulder portions formed on said movable closure member and arranged to engage between said first mentioned shoulder portions, and means for yieldably urging said movable closure member towards said fixed member for enclosing said film between said members without normally gripping the film therebetween, said flexible means serving to yieldably maintain said apertures in operative alignment when the closure member is moved away from the fixed member for allowing the film to be inserted into or removed from said gate member or for allowing a splice in the film to pass between said members.

16. In a projection device of the character described a support, a film gate and film reel supporting means mounted thereon, a pair of spindles rotatably carried by said means for supporting film reels in spaced relation and positioning film extending therebetween in alignment with said film gate, and means operatively associated with said spindles for actuating said spindles for moving the film across said gate in either direction, said actuating means comprising a driving member, an intermediate collar and a driven member operatively associated with each spindle, a coupling member pivotally carried by each collar, each driving member and driven member having surfaces thereon engaged by the associated coupling member for rotating the driven member and spindle in a predetermined direction when the driving member is rotated by the actuating means, said coupling member being rendered inoperative for rotating said driven member and spindle in either direction when said driving member is rotated in the opposite direction, said coupling member having a bifurcated end engaging the driving member and a toothed end adapted to positively engage said driven member when said driving member is rotated in said predetermined direction, said toothed end being releasable from said driven member for allowing independent rotation of said spindle when the driving member is rotated in the opposite direction and when the film on the reel carried thereby is so tensioned as to cause rotation of the driven member faster than the driving member in said opposite direction.

17. A projection device of the character described comprising an enclosed housing having a recess formed in an upper wall portion thereof, said housing having a front wall formed by an upper section and a lower section, a viewing screen forming a part of said upper section, a projection system carried by said housing, said projection system comprising a light source, a rotatable film reel supporting head and a substantially horizontally disposed objective, reflecting means within said housing and arranged for directing light from said objective onto said viewing screen, said reflecting means comprising a first reflector adjacent the objective and a second reflector in the lower part of said housing so as to be adjacent the legs of an operator seated in front of the device, said film reel supporting head being positioned in said recess and extending into said housing so as to mount said head for rotation about the optical axis of said objective, said head having laterally extending spindle supporting arms arranged to swing through said recess when said head is rotated and having an apertured film gate centrally positioned thereon, said screen being located in said upper front wall section and having its upper edge located adjacent the light source, and being so disposed as to extend in a downwardly and forwardly inclined direction to be conveniently located for observation by said operator seated in front of the device, said lower front wall section extending in a downwardly and rearwardly inclined direction so as to provide an unobstructed space for the knees of said operator.

18. A projection device of the character described comprising a housing, a viewing screen forming a sloping front wall portion thereof, a plurality of reflectors completely enclosed within said housing, an image forming system comprising a light source, a generally horizontally disposed objective and a film gate arranged in optical alignment in an upper part of said housing, means for mounting one of said reflectors for movement from its normal position into any of a plurality of predetermined aligned positions, said movable reflector in its normal position being arranged to direct the light from said objective downwardly onto a second of said reflectors for projection upwardly and forwardly onto said viewing screen, and when moved to a second position being disposed to direct said light upwardly onto a ceiling or the like, said movable reflector also being movable into a third position for allowing said light to be directed generally horizontally onto a surface or wall disposed at a distance from said device, and means associated with said image forming system for varying the operative conditions thereof as desired when projecting onto said screen, ceiling or wall surface.

19. A projection device of the character described comprising a supporting structure, an elongated tubular support rigidly carried by said structure, an objective lens mount adjustably positioned in said tubular support, a film reel supporting head including an elongated sleeve pivotally mounted on said tubular support and adapted to rotate about said support and optical axis of said objective, a driving ring rotatably positioned on said sleeve and adapted to rotate about said optical axis, said supporting head carrying a longitudinally curved film gate thereon in axial alignment with said objective lens mount, a pair of laterally extending rigid arms integral with said sleeve and having a pair of spindles positioned thereon at opposite sides of said gate, friction means engaging each spindle, driving means including a positive one way clutch associated with each spindle, an endless belt operatively connecting said driving ring and said spindles, and means on said supporting structure including a manual control for rotating said ring to selectively rotate one or the other of said spindles for moving the film in either direction across said gate regardless of the angular position of said head.

20. In a projection device of the character described a support, a film gate and film reel supporting means mounted thereon, a pair of spindles rotatably carried by said means for supporting film reels in spaced relation and positioning film extending therebetween in alignment with said film gate, and means operatively associated with said spindles for selectively actuating one or the other of said spindles for moving the film across said gate in either direction, said actuating means comprising a rotatable driving member, a rotatable intermediate collar and a rotatable driven member operatively associated with each spindle, a coupling member in the form of a lever pivotally carried by each intermediate collar, each lever having a first arm operatively connected to its associated driving member and a second arm arranged for movement into or out of positive driving engagement with its associated driven member, each lever being responsive to slight relative rotational movement between the associated driving member and its supporting collar for causing pivotal movement of said lever into or out of engagement with the associated driven member depending upon the direction of rotation of the driving member.

21. A projection device of the character described comprising a floor supported base, a vertically elongated enclosed housing carried thereby, a viewing screen forming a front sloping wall portion of said housing, reflecting means within said housing and a projection system supported by said housing, said projection system comprising a light source, film reel supporting means, a film gate and an objective lens system adapted to project light passing through said gate toward said reflecting means so as to be reflected thereby upwardly and forwardly toward said screen, said screen having an edge thereof positioned adjacent said projection system and extending in a downwardly and forwardly inclined direction therefrom so as to be convenient for observation by an operator from a position in front of said device, a movable hood upon said housing and partially enclosing said screen when in a raised operative position for shielding the screen from external light, said hood having a top and depending arcuate side members, elongated slots in said housing at opposite sides of said screen, adapted to receive said side members, said hood being pivotally supported on said housing adjacent the upper edge of said screen for downward swinging movement from said raised position to a lowered position closely overlying and protecting said screen with said arcuate side members disposed within said housing.

22. The structure as recited in claim 21 and wherein one of said arcuate side members is recessed adjacent its lower edge, and a slot formed in a side of said housing adjacent said viewing screen and said recess for the insertion of a printing frame within said housing and adjacent said screen while said hood is in its raised position, said hood closing said last mentioned slot when moved to its lowered position closely overlying and protecting said screen.

23. A device of the character described comprising a floor supported base, a vertically elongated substantially enclosed housing carried thereby, said housing having a pair of openings formed in the upper part thereof and having a sloping front wall portion which extends downwardly and rearwardly so as to provide a reduced cross-sectional area for said housing in the lower portion thereof and adjacent said supporting base, a viewing screen closing one of said openings, a projection system carried by an upper part of said housing and closing the other of said openings, reflecting means positioned within the lower end of said housing and so disposed that light from said projection system will be directed upwardly and forwardly toward said viewing screen, said viewing screen having its upper edge located adjacent said projection system and being disposed so as to extend in a downwardly and forwardly inclined direction toward the upper edge of said sloping front wall portion, and so as to be conveniently located for observation by an operator from a seated position in front of said device, the downwardly and rearwardly sloping front wall portion of said housing thus being disposed so as to provide a clearance for the knees of said operator.

24. The structure recited by claim 23 and comprising a hood pivotally mounted upon said housing adjacent the upper edge of said screen and substantially enclosing said screen when in a raised operative positon for shielding the screen from external light, said hood having a top and depending arcuate side members adapted to extend into elongated slots in said housing at opposite sides of said screen so as to be disposed within said housing when said hood is pivoted downwardly wherein the top closely overlies and forms a protective covering for said screen.

ALBIN A. GRADISAR.

REFERENCES CITED

The following references are of record in the file of this patent:

UNITED STATES PATENTS

| Number | Name | Date |
| --- | --- | --- |
| 1,421,523 | Mechau | July 4, 1922 |
| 1,454,001 | Smithers | May 1, 1923 |
| 1,846,004 | Green | Feb. 16, 1932 |
| 2,003,691 | Lundberg | June 4, 1935 |
| 2,008,982 | Hopkins | July 23, 1935 |
| 2,035,780 | Beardsley et al. | Mar. 31, 1936 |
| 2,195,425 | Roger | Apr. 2, 1940 |
| 2,265,992 | Beck | Dec. 16, 1941 |
| 2,279,463 | Hopkins | Apr. 14, 1942 |
| 2,313,639 | Hauser | Mar. 9, 1943 |
| 2,332,810 | Place | Oct. 26, 1943 |
| 2,377,476 | Berglund | June 5, 1945 |
| 2,389,087 | Schubert | Nov. 13, 1945 |